United States Patent
Feiereisen et al.

(10) Patent No.: US 9,792,014 B2
(45) Date of Patent: Oct. 17, 2017

(54) IN-PLACE CONTEXTUAL MENU FOR HANDLING ACTIONS FOR A LISTING OF ITEMS

(71) Applicant: Microsoft Corporation, Redmond, WA (US)

(72) Inventors: Jeffrey K. Feiereisen, Seattle, WA (US); Yung-Cheng Chen, Bellevue, WA (US); Ryan Thomas Murphy, Seattle, WA (US); Eva Britta Karolina Burlin, Bellevue, WA (US); Michael Anthony Faoro, North Bend, WA (US); Kenneth Fern, Bellevue, WA (US); Michael R. Gow, Redmond, WA (US); Chao-Chung Lin, Redmond, WA (US); Joseph McLaughlin, Seattle, WA (US)

(73) Assignee: Microsoft Technology Licensing, LLC, Remond, WA (US)

( * ) Notice: Subject to any disclaimer, the term of this patent is extended or adjusted under 35 U.S.C. 154(b) by 128 days.

(21) Appl. No.: 13/834,496

(22) Filed: Mar. 15, 2013

(65) Prior Publication Data

US 2014/0282254 A1  Sep. 18, 2014

(51) Int. Cl.
*G06F 3/00* (2006.01)
*G06F 3/0484* (2013.01)
(Continued)

(52) U.S. Cl.
CPC ........ *G06F 3/04842* (2013.01); *G06F 3/0482* (2013.01); *G06F 3/04883* (2013.01); *G06F 3/04886* (2013.01)

(58) Field of Classification Search
CPC ....... G06F 3/048; G06F 3/0482; G06F 3/0487
(Continued)

(56) References Cited

U.S. PATENT DOCUMENTS 8,059,101 B2    11/2011 Westerman et al.
8,078,979 B2 *  12/2011 Howard ................ G06F 3/0481
                                            382/305
(Continued)

OTHER PUBLICATIONS

Zheng, Long., "Dissecting the Windows 8 Touch UI Demo from D9", Retrieved at <<http://www.istartedsomething.com/20110602/dissecting-the-windows-8-touch-ui-demo-from-d91, Jun. 2, 2011, pp. 26.

(Continued)

*Primary Examiner* — Kieu Vu
*Assistant Examiner* — Andrew Chung
(74) *Attorney, Agent, or Firm* — Talem IP Law, LLP (57) ABSTRACT

Techniques for providing an in-place contextual menu and user interface for email and other information management system triage are provided in which a contextual menu can be overlaid or replace an item on a view screen. The contextual menu can provide action commands specific to the type and state of the items selected in the feature view of the email or other information management system. A single recognized selection input, such as a swipe gesture, selects an item and invokes an in-place contextual menu presenting actions that can be asserted on the selected item. Multiple item selection is available through the same invocation of presenting the in-place contextual menu.

23 Claims, 6 Drawing Sheets

(51) Int. Cl.
*G06F 3/0482* (2013.01)
*G06F 3/0488* (2013.01)

(58) Field of Classification Search
USPC .......................................................... 715/835
See application file for complete search history.

(56) References Cited

U.S. PATENT DOCUMENTS

| | | | |
|---|---|---|---|
| 2009/0278806 A1* | 11/2009 | Duarte et al. | 345/173 |
| 2009/0282360 A1* | 11/2009 | Park et al. | 715/786 |
| 2009/0319953 A1* | 12/2009 | Tsai | G06F 3/0482 715/841 |
| 2011/0202882 A1* | 8/2011 | Forstall et al. | 715/835 |
| 2011/0219332 A1* | 9/2011 | Park | H04M 1/72583 715/808 |
| 2011/0307804 A1* | 12/2011 | Spierer | 715/752 |
| 2013/0117713 A1* | 5/2013 | Bauder | G06F 3/0482 715/810 |
| 2013/0159902 A1* | 6/2013 | Kwak et al. | 715/765 |
| 2013/0227413 A1* | 8/2013 | Thorsander et al. | 715/716 |
| 2013/0227454 A1* | 8/2013 | Thorsander et al. | 715/767 |
| 2013/0227470 A1* | 8/2013 | Thorsander et al. | 715/790 |
| 2013/0227482 A1* | 8/2013 | Thorsander et al. | 715/821 |
| 2013/0227483 A1* | 8/2013 | Thorsander et al. | 715/821 |
| 2013/0227490 A1* | 8/2013 | Thorsander et al. | 715/841 |
| 2013/0278708 A1* | 10/2013 | Mock | G06F 3/0482 348/14.03 |
| 2013/0283185 A1* | 10/2013 | Mock | G06Q 10/103 715/746 |
| 2014/0026099 A1* | 1/2014 | Andersson Reimer et al. | 715/825 |
| 2014/0143683 A1* | 5/2014 | Underwood et al. | 715/752 |
| 2014/0189595 A1* | 7/2014 | Waldman et al. | 715/835 |
| 2014/0223347 A1* | 8/2014 | Seo et al. | 715/769 |
| 2014/0282243 A1* | 9/2014 | Eye et al. | 715/810 |
| 2014/0304615 A1* | 10/2014 | Coe | G06F 3/04842 715/752 |

OTHER PUBLICATIONS

"Touch Interaction Design (Windows Store apps) (Windows)", Retrieved at <<http://msdn.microsoft.com/en-in/library/windows/apps/hh465415.aspx>>, Retrieved Date: Mar. 5, 2013, pp. 13.

Roth, et al., "Bezel Swipe: Conflict-Free Scrolling and Multiple Selection on Mobile Touch Screen Devices", Retrieved at <<http://www.volkerroth.com/download/Roth2009a.pdf>>, In Proceedings of the SIGCHI Conference on Human Factors in Computing Systems, Apr. 4, 2009, pp. 4.

"Nexus 4 Guidebook", Retrieved at <<http://static.googleusercontent.com/external_content/untrusted_dlcp/www.google.com/en//help/hc/images/android/android_ug_42/Nexus-4-Guidebook.pdf>>, Retrieved Date: Mar. 5, 2013, pp. 235.

"Prioritizing Your Data", Retrieved at <<http://technet.microsoft.com/en-us/library/cc749544(v=ws.10).aspx>>, Jun. 11, 2010, pp. 3.

"Multi Swipe Controls Template", Retrieved at <<http://www.deepblueapps.com/multi-swipe-controls-template/>>, Retrieved Date: Mar. 5, 2013, pp. 3.

"Swipe for Action", Retrieved at <<http://www.androidpatterns.com/uap_pattern/swipe-for-action>>, Retrieved date Mar. 12, 2013, pp. 6.

* cited by examiner

IN-PLACE CONTEXTUAL MENU FOR HANDLING ACTIONS FOR A LISTING OF ITEMS

BACKGROUND

Triaging refers to techniques for handling a long list of action items or issues based on assigned or perceived importance to their care. One area having a long list of action items for a user to handle is email. Email triage techniques are aimed towards helping a user to quickly go through unhandled email and deciding what actions to take with respect to those emails. For example, a user may act on the email—by reading all or a portion of the email, choosing to not read the email, sending a reply, forwarding the email, or performing some other task associated with the email such as writing another email or copying or modifying a document attached to the email. In some cases, a user handles multiple emails at the same time, for example, moving a batch of emails to a folder or trash.

A reviewing pane is one approach in a user interface to help a user make a decision whether the email is important and whether it should be handled immediately or can wait for a later date or time. Other functions included in user interfaces for triaging include grouping, flagging, searching and sorting. Efficient handling of long lists of items including emails continues to be an area for improvement to reduce the amount of time users spend processing their emails or other task items.

BRIEF SUMMARY

A user interface with in-place contextual menu for handling actions for a listing of items that may be operated on, and techniques for facilitating triaging of items that may be operated on are described.

In some embodiments, a user interface for email and other information management system triage is provided in which a contextual menu can be overlaid or replace an item on a view screen. The contextual menu can provide action commands specific to the type and state of the items selected in the feature view of the email or other information management system.

The item selection and invoking of a contextual menu can be a single input action. For embodiments supporting gestural input, a single swipe motion for touch devices can select an item and invoke an in-place contextual menu to appear on the selected item. Multiple item selection is supported through the same gestural input.

A swipe motion for touch devices can introduce a swipe menu that not only presents an in-place contextual menu for actions that can be applied to a selected item, but includes multi-selection availability.

According to an embodiment, each swipe motion or other recognized selection input causes an item to be selected until an action command or a deselect input is received while, at the same time, an in-place contextual menu follows a user's most recent recognized selection input.

Some embodiments of the in-place contextual menu are supported by a web application; other embodiments are supported by a native application or operating system of a user computing device; yet other embodiments are supported by an application programming interface that enables a list of items to have an in-place contextual menu for actions be available to an information management application interface and multiple selection swipe or other recognized selection support.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An in-place contextual menu is disclosed that helps a user more efficiently handle actions for a list of items. The in-place contextual menu can be used for handling actions for a listing of items that may be operated on, facilitating the triaging of items for action. An "in-place" menu refers to a menu that replaces, overlays, or shares the space of an item in a view of that item.

Embodiments can be implemented as part of calendaring or scheduling software that is a stand-alone application or a component of a personal organizer or information management system. The personal organizer or information management system can be a personal information manager (PIM) tool configured for a mobile or desktop computing device. Examples of PIM applications include MICROSOFT OUTLOOK and OUTLOOK Web App (OWA) available from Microsoft Corp, GMAIL available from Google, Inc., and YAHOO!MAIL available from Yahoo!, Inc. A PIM can include one or more features such as scheduling and calendar programs, task lists, address books, and e-mail programs.

In a PIM, emails or other items such as calendaring items can be triaged through a contextual tool that provides commands such as delete, flag/mark complete, move, mark as unread/mark as read, and even categorize.

Embodiments can also be implemented as part of a social media application, curation tool, or any other application in which list items may be acted upon configured for a mobile or desktop computing device. In such applications, content including messages and images may be triaged through a contextual tool that provides commands such as delete, share, and categorize. Examples of social media and blogging applications include the FACEBOOK online social networking service available from Facebook, Inc. and the TWITTER online social networking service available from Twitter, Inc.

It should be understood that the particular commands surfaced on the contextual tool can be suited for the application in which the tool is used as well as the available commands for a particular item being selected. This contextual tool can be referred to as an "in-place menu." The tool is considered to be contextual because it provides commands based on the available actions that may be carried out for an item in the feature view of the user interface. For example, an in-place menu for an email list can expose the delete, flag, move, and read/unread commands. An in-place menu for a message feed may include star/favorite, show user profile, reply, and repost. An in-place menu for a contacts list may include call, instant message, email, or share contact command.

In addition to the commands specific to the application in which the in-place menu is used, the commands can be contextual to the state of the item. For example, in an email item that is in a state of being unread, the in-place contextual menu can include a command for "read" or if the email item is in the state of being flagged, the contextual menu can provide a command for "completed".

The commands can further be contextual based on the type of item being selected and presents commands associated with actions that can be performed on that type. Item types include, but are not limited to, an email, a message, a calendar event, a photograph, or a contact. When multiple types of items are selected, the tool can present the commands the items have in common (e.g., the common denominator). For example, a meeting request and an email may both be items in an in-box of the user. If a meeting request is selected, action items may include scheduling commands accept, tentative and decline; whereas if both an email and a meeting request is selected, common action items may be delete.

In another embodiment, when multiple types of items are selected, the tool can be split and present commands from both types—regardless of the specific item type underlying the in-place menu. In yet another embodiment, multiple in-place menus may remain overlying the different item types so that all items of one type are acted on via one of the in-place menus and all items of another type are acted on via another one of the in-place menus.

To invoke the in-place menu, the user can slide their finger across an item provided in a list view of the user interface. The sliding of the user's finger can be considered a "swipe" action. The swipe action can be a touch gesture or a mouse hold and swipe representing a selection of the item in the list for invoking the in-place menu.

Although a "swipe" is discussed as being the gesture to invoke the in-place menu, it should be understood that the swipe gesture may be defined in various ways and can depend on the resolution of the display and the technology sensing the input. In addition, embodiments are not limited to using a swipe gesture for invoking the in-place menu. Therefore, it should be understood that where it is discussed that an action results from a determination of a swipe input (or that a swipe is performed by a user), other gestures and input may be used in its place so long as the system can recognize the input and have that input associated with executing a command to invoke the in-place menu (e.g., as a recognized selection input).

As a user swipes on an item, the in-place menu can appear to slide with the user's finger across the item. The menu can be configured to follow the finger across the screen, regardless of direction that a user's sweeps.

Figures 1A, 1B:
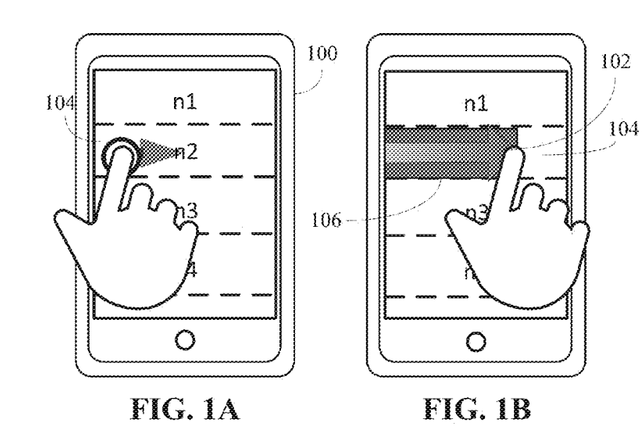
FIGS. 1A-1F illustrate a scenario involving an implementation of an in-place contextual menu for handling actions for a listing of items.
Figure 1C:
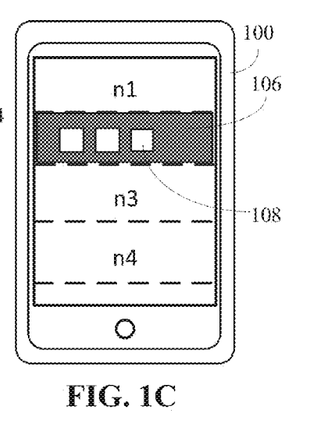

FIGS. 1A-1F illustrate a scenario of an implementation of an in-place contextual menu for handling actions for a listing of items. As shown in FIGS. 1A-1C a general work flow for swipe for action is carried out by a user performing a swipe gesture on an item in the list. The list may include an array of n items (e.g., n1, n2, n3, n4, . . . ), where n is an integer, and every item in the array is provided a distinct boundary in which a touch, click, or other interaction can be recognized.

Referring to FIGS. 1A and 1B, a user can invoke an in-place menu by swiping an item displayed as part of an information management or other application on a computing device 100.

The figure shows a swipe (e.g., 102) to the right; however, it should be understood that the swipe movement may be vertical, diagonal, sweeping to the left, or sweeping in some other assigned path. In addition, although the selection action has been described as a swipe, it should be understood that the selection criteria is not limited to swipe and that other actions, such as click, tap, tap and hold, circle, or other gesture, voice, or input can be used to indicate invocation of the in-place menu.

Referring to FIG. 1B, as the user swipes (102) across an item 104, the in-place menu 106 can appear to slide in the direction with the user's finger such that the item 104 becomes covered by a layer presenting a menu with action commands (the in-place menu 106). In addition to sliding a layer over the item, other non-limiting example animations that may be implemented include pushing the item out of the window with the menu and springing the menu into place.

Once the in-place menu 106 covers the item 104, as shown in FIG. 1C, the user may select an action 108 from the in-place menu 106 to act upon the item that the menu 106 covers. The action (or action command) in the in-place menu can include commands that directly affect the underlying item as well as commands that launch a menu with more choices or actions relevant to the selected items.

According to embodiments of the invention, the ability to perform an action on an item through an in-place menu follows the user as the user selects multiple items to act upon without the user having to actively switch into a multi-select mode.

Figure 1D:
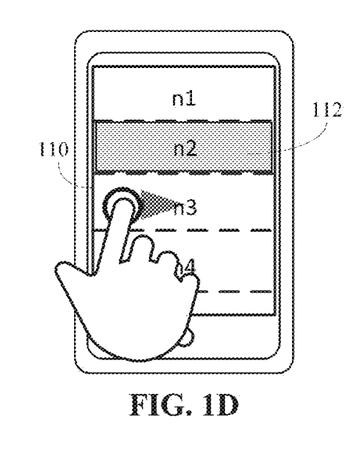
Figure 1E:
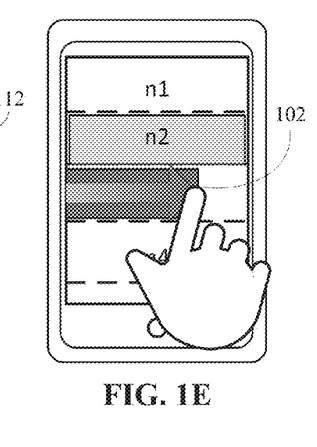
Figure 1F:
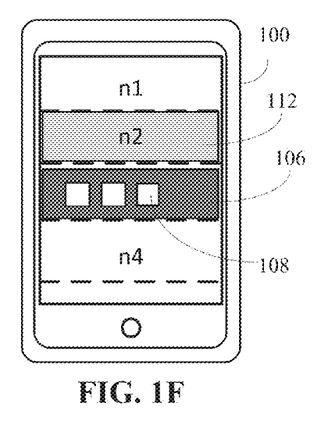

As shown in FIG. 1D, the user can swipe across a next item 110 without losing the selection of the item 104 from a previous swipe. Instead, an in-place menu 106 can be brought into place over the next item 110 the user swipes (102), as shown in FIGS. 1E and 1F. The previously swiped item (e.g., item 104) can remain in a state with a menu covering the item or can be highlighted or otherwise indicated as selected 112. In addition to distinguishing between currently swiped and previously swiped selection for the in-place menu, in the user interface, the in-place menu selection can be distinguished from a general selection (e.g., to perform a direct command) by visual cues or icons.

When the user selects an action 108 from the in-place menu 106, the action is carried out with respect to the item covered by the in-place menu 106 as well as any other items that were swiped without being deselected by the user.

In addition to providing an in-place contextual menu overlaying the item being acted on, it is possible to swipe over multiple items to select them. Not only is it possible to select multiple items using the swipe, a single action can be performed on all items of the selection. Of course, in some cases less than all items may be acted upon.

Advantageously, there is no need for a user to specifically switch modes to indicate that multiple items are being selected in order for the system to provide a multi-mode capability. The multiple items can be selected without entering into an explicit edit mode.

According to embodiments, the actions (and menu) follow the user around as the user continues to swipe on other items. That is, the in-place menu can appear on each item that a user swipes as the user performs the swipe on the item. Instead of deselecting an item when a next item is swiped, a previous swipe can be recognized as remaining in the swipe-selected mode—and selection can be maintained on the items being previous swiped over—even as the in-plane menu moves to subsequent items being swiped.

The combination of single swipe aggregation of items to facilitate a multi-item selection along with the in-place contextual menu for executing a command with respect to selected items can help a user perform tasks more efficiently and with less steps.

As mentioned, in certain embodiments, the actions (commands) of the in-plane menu follow the user around wherever the user swipes. In another embodiment, the actions remain displayed on each individual selected item (and a selection of the action on any one of them can either cause that action to be performed on all selected items or on a subset of the selected items). In yet another embodiment, the in-plane menu remains only on the originally selected item and subsequent selections are merely grouped and indicated as selected.

Figure 2:
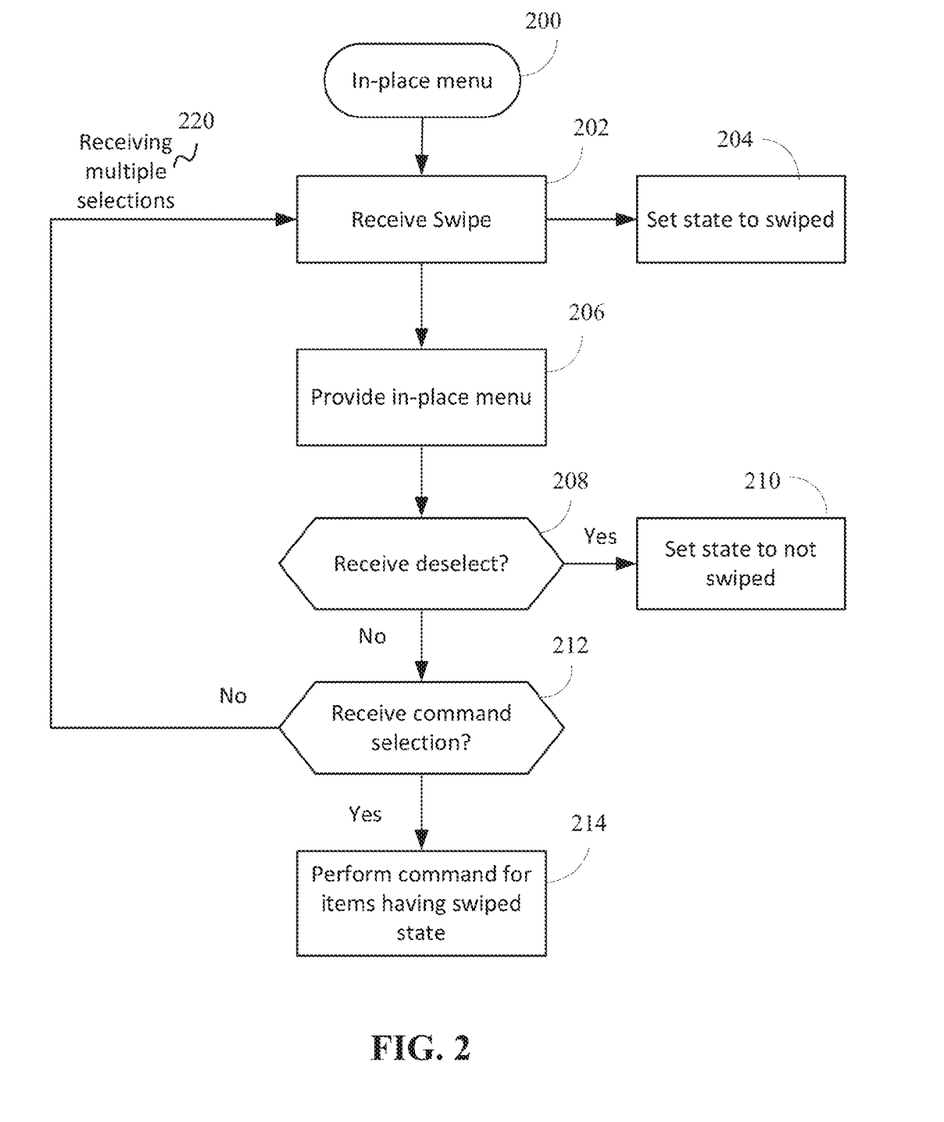
FIG. 2 illustrates a process flow diagram for implementing an in-place contextual menu for handling actions for a listing of items.

FIG. 2 shows a process flow diagram for implementing an in-place contextual menu for handling actions for a listing of items.

Referring to FIG. 2, the invocation of an in-place contextual menu (200) begins when a determination is made that a "swipe" is received (202). The determination can be performed using any suitable detection method and/or gesture recognizer supported by a software development kit.

In response to receiving a "swipe" on an item (such as item 110), the state of the item can be set to swiped (204) and the in-place menu can slide in to view or be otherwise provided (206). For example, where the menu is already presented in-place over a first item when a swipe is received (202), such as when multiple selections occur (220), the in-place menu may "jump" from the first item to the item corresponding to the current "swipe". That is, the in-place menu can be provided in place of a second (or more) item and removed from covering the first item.

The menu may track the user's finger during the swipe. When providing the menu, the swipe determination can be used to bring the menu to the location the finger is expected to move so that the menu appears to be dragged, slid or otherwise moved into location.

After the in-place menu is presented (206), in some cases, a user may choose to not take an action with respect to the commands provided on the in-place menu. A deselect input may be provided to deselect an item. The deselect input can be a second swipe on the item. The second swipe may be a same gesture or a different gesture than the first swipe that invokes the in-place menu. The deselect input may be a tap (inside or outside the selection), or selection of an explicit cancel button, or a voice command, or other input indicating deselection of one or more items. When a determination is made that a deselect input has been received (208), the state of the item can be set to not swiped (210).

Instead of deselecting an item when another swipe is received, a selection of an item changes the state for the item and that state remains unless an action from an in-place menu is executed or the item unselected. Thus, when a command selection from an in-place menu is received (212), any items having the state set to swiped can be acted on by the command (214).

According to embodiments of the invention, the same model is used for selection and for providing the in-place menu commands whether a single item is being selected or multiple items are being selected. That is, a same gesture or input is used for both single item selection and multiple item selection, and the user does not need to indicate that multi-selection mode is being implemented. This contrasts with applications having only single selection or having a multi-select mode that requires an extra step or pre-indication to invoke. For example, the extra step may be holding down a key or performing a hold and swipe gesture while making each selection.

Figure 3A:
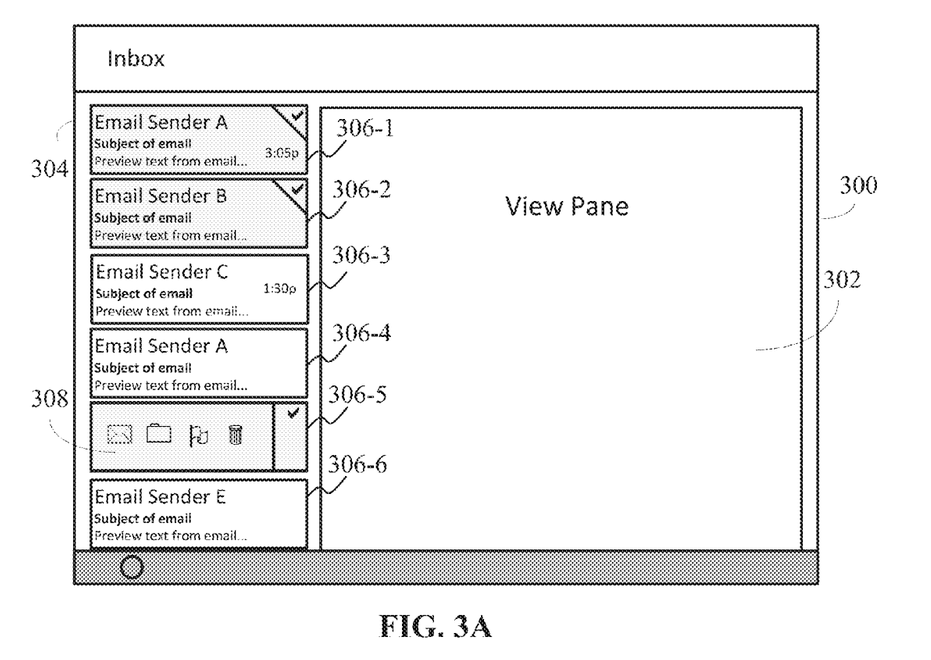
FIGS. 3A and 3B illustrate example user interfaces for an email application of a tablet device (FIG. 3A) and a smart phone (FIG. 3B) having an in-place contextual menu for handling actions for a listing of items.
Figure 3B:
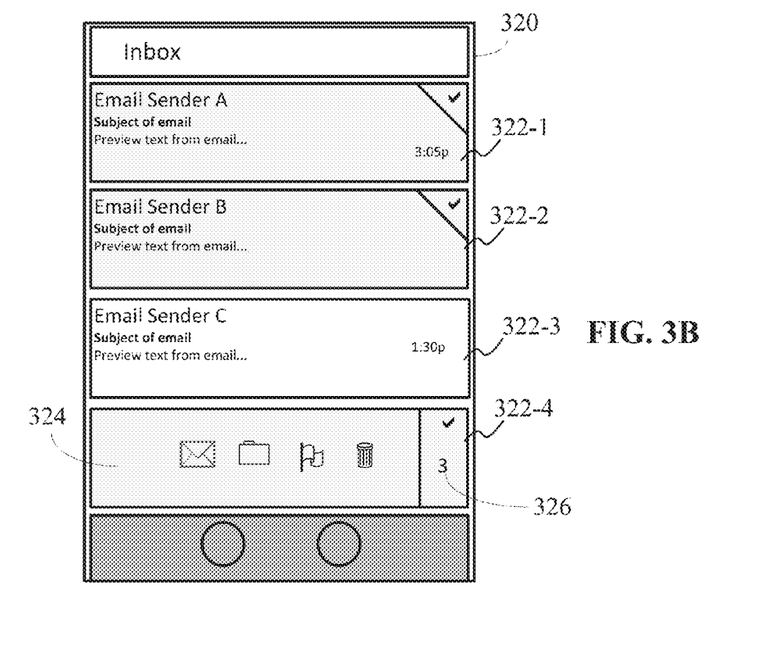

FIGS. 3A and 3B illustrate example user interfaces for an email application of a tablet device (FIG. 3A) and a smart phone (FIG. 3B) having an in-place contextual menu for handling actions for a listing of items. In these examples, the items are email items. However, embodiments are not limited thereto.

The email application can be a web application providing online and offline functionality. In some cases, the email application may be a native application stored on the user's computing device (e.g., tablet device 300, smart phone device 320). In another embodiment, the user may access a web-based application using a web browser (e.g., a standard Internet browser or mobile browser), and the application's interface may be displayed to the user within the internet browser. Thus, the application may be a client-side application and/or a non-client side (e.g., a web-based) application.

Although a tablet device 300 and a smart phone device 320 are specifically discussed, embodiments are not limited thereto. For example, the computing devices may include, but are not limited to, a personal computer, a tablet, a reader, a mobile device, a personal digital assistant (PDA), a smartphone, a laptop (or notebook or netbook) computer, a gaming device or console, a desktop computer, or a smart television.

Referring to FIG. 3A, a user inbox of an email (or PIM) application displayed on a tablet device 300 can include an item pane 304 and a view pane 302 rendered in a view for the application. A list of items (306-1, 306-2, 306-3, 306-4, 306-5, 306-6, . . . ) can be provided in the item pane 304.

Referring to FIG. 3B, a user inbox of an email (or PIM) application displayed on a smart phone device 320 can include a list of items (322-1, 322-2, 322-3, 322-4, . . . ) rendered in a view for the application.

In a touch mode of a mixed touch and pointer device system or for pure touch devices, the user interface is made bigger in order to accommodate using a finger to select a command from the toolbar. Similarly, for smart phones, which have a small screen size to begin with, certain features are made bigger and even removed to accommodate the limited space. In order to preserve space of a user interface (UI), some of the commands may disappear.

A UI is used to interact with various applications, such as an email (or PIM) application, running on or displayed through the computing device. One or more user interfaces of one or more types may be used to interact with content. For example, a UI may include the use of a context menu, a menu within a menu bar, a menu item selected from a ribbon user interface, a graphical menu, and the like. Menus may be in a traditional bar form or in a ribbon form or as a palette or other presentation of commands. Generally, UI is configured such that a user may easily interact with functionality of an application. For example, a user may simply select an option within UI to perform an action such as "mark as unread" in an email application.

By surfacing an in-place menu, the likely commands for the user can appear as needed and within the user's action area, promoting more efficient action selection as well as minimizing the space the menu takes up.

As shown in FIGS. 3A and 3B, a distinction can be made in the user interface between the item on which the user is currently swiping and the items already swiped and having a swiped state. In FIG. 3A, a user may have consecutively swiped items 306-1, 306-2, and 306-5; and in FIG. 3B, a user may have consecutively swiped items 322-1, 322-2, and 322-4.

To avoid having the actions repeat themselves on every item, while also maintaining close proximity to where the user swiped, an in-place menu jump from selection to selection can be provided, following the user to the last selected item. For example, the in-place menus 308 and 324 can be located in place of the last item the user selected.

In a tablet or larger screen, the view pane 302 can be visible in addition to the list 304. When one item is selected, the view pane 302 may provide a preview of the email. In the tablet or larger screen view, following a single swipe, a subsequent swipe on another item can update the view pane 302 (regardless of its contents) with a multi-select mode pane (not shown), providing the users the actions presented on the in-place menu. When in multi-select mode, the view pane 302 may display additional help or some other feature, such as another listing of the commands available on the in-place menu. The multi-select mode pane can be useful in scenarios where the user slides the in-place menu out of view to review selected items (or perform some other action).

The number of items selected may also be tracked and displayed. For example, the in-place menu can expose a counter that increments as the user selects more items. The counter may surface on the selected item(s) (for example counter 326) or at a designated location in the viewing screen (such as in the multi-select mode pane).

In the same way that a user swipes to select, an item can be deselected using a gesture such as a swipe. When swiping across a selected item that contains the in-place menu (e.g., the most recent selection), the in-place menu can slide out of view can even jump back to the previously selected item. When swiping across a selected item that does not contain the in-place menu, the in-place menu can stay in its existing location. In both cases, when a counter is included, the in-place menu's counter may decrement with each deselection.

The swipe selection can be a different gesture than a general selection of an item. In addition, where an item is default selected, such as when an email is selected by default for viewing in the view pane 302, the default selection can be maintained as a separate type of selection and not included in a swipe scenario action, avoiding a user having to swipe on the second item and then deselect the first item before taking an action.

Since a single gesture, for example swipe, is used to select and action an item, fewer steps may be carried by the user, which can be useful for improved efficiency during triage.

To provide the in-place contextual menu, a computing device, such as, but not limited to, tablet device 300 and smart phone device 320, can involve computing systems such as described with respect to FIGS. 4, 5, and 6A-6D.

Figure 4:
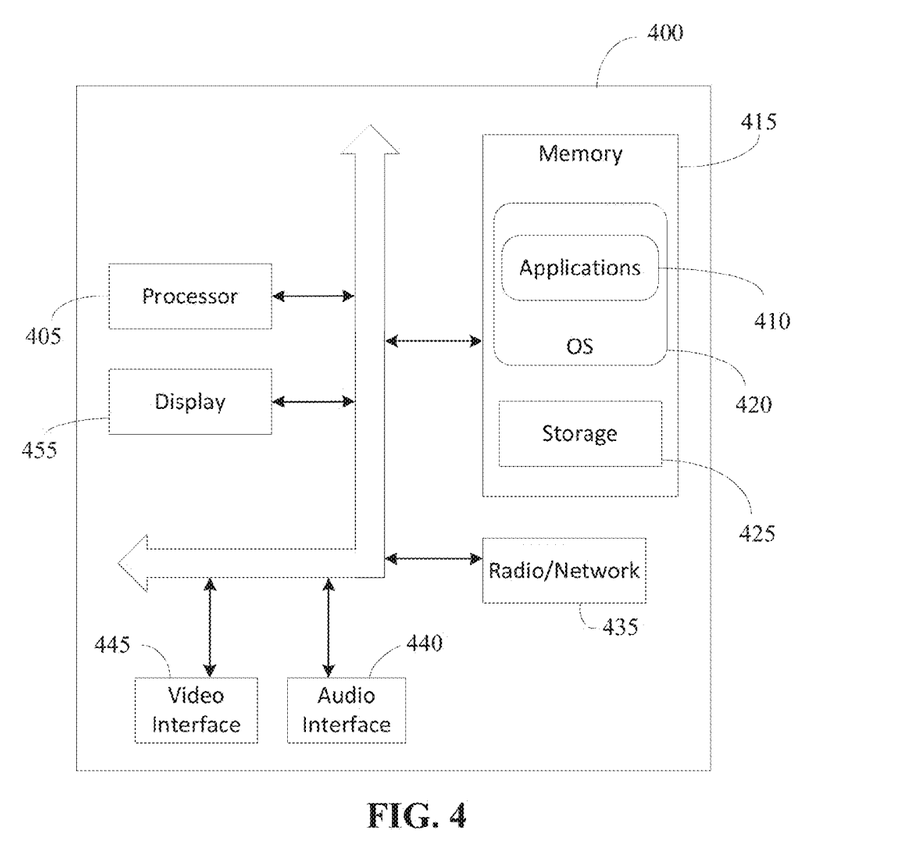
FIG. 4 is a block diagram illustrating components of a computing device used in some embodiments.

FIG. 4 shows a block diagram illustrating components of a computing device used in some embodiments. For example, system 400 can be used in implementing a mobile computing device such as tablet device 300 or smart phone device 320. It should be understood that aspects of the system described herein are applicable to both mobile and traditional desktop computers, as well as server computers and other computer systems.

For example, system 400 includes a processor 405 that processes data according to instructions of one or more application programs 410, and/or operating system (OS) 420. The processor 405 may be, or is included in, a system-on-chip (SoC) along with one or more other components such network connectivity components, sensors, video display components.

The one or more application programs 410 may be loaded into memory 415 and run on or in association with the operating system 420. Examples of application programs include phone dialer programs, e-mail programs, PIM programs, word processing programs, Internet browser programs, messaging programs, game programs, and the like. Other applications may be loaded into memory 415 and run on the device, including various client and server applications.

Examples of operating systems include SYMBIAN OS from Symbian Ltd., WINDOWS PHONE OS from Microsoft Corporation, WINDOWS from Microsoft Corporation, PALM WEBOS from Hewlett-Packard Company, BLACKBERRY OS from Research In Motion Limited, IOS from Apple Inc., and ANDROID OS from Google Inc. Other operating systems are contemplated.

System 400 may also include a radio/network interface 435 that performs the function of transmitting and receiving radio frequency communications. The radio/network interface 435 facilitates wireless connectivity between system 400 and the "outside world," via a communications carrier or service provider. Transmissions to and from the radio/network interface 435 are conducted under control of the operating system 420, which disseminates communications received by the radio/network interface 435 to application programs 410 and vice versa.

The radio/network interface 435 allows system 400 to communicate with other computing devices, including server computing devices and other client devices, over a network.

In various implementations, data/information stored via the system 400 may include data caches stored locally on the device or the data may be stored on any number of storage media that may be accessed by the device via the radio/network interface 435 or via a wired connection between the device and a separate computing device associated with the device, for example, a server computer in a distributed computing network, such as the Internet. As should be appreciated such data/information may be accessed through the device via the radio interface 435 or a distributed computing network. Similarly, such data/information may be readily transferred between computing devices for storage and use according to well-known data/information transfer and storage means, including electronic mail and collaborative data/information sharing systems.

An audio interface 440 can be used to provide audible signals to and receive audible signals from the user. For example, the audio interface 440 can be coupled to speaker to provide audible output and a microphone to receive audible input, such as to facilitate a telephone conversation. System 400 may further include video interface 445 that enables an operation of an optional camera (not shown) to record still images, video stream, and the like.

Visual output can be provided via a display 455. The display 455 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form.

The display 455 may be a touchscreen display. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

In some embodiments, the touchscreen is a single-touch touchscreen. In other embodiments, the touchscreen is a multi-touch touchscreen. In some embodiments, the touchscreen is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen. As such, a developer may create gestures that are specific to a particular application program.

In some embodiments, the touchscreen supports a tap gesture in which a user taps the touchscreen once on an item presented on the display. The tap gesture may be used for various reasons including, but not limited to, opening or launching whatever the user taps. In some embodiments, the touchscreen supports a double tap gesture in which a user taps the touchscreen twice on an item presented on the display. The double tap gesture may be used for various reasons including, but not limited to, zooming in or zooming out in stages, and selecting a word of text. In some embodiments, the touchscreen supports a tap and hold gesture in which a user taps the touchscreen and maintains contact for at least a pre-defined time. The tap and hold gesture may be used for various reasons including, but not limited to, opening a context-specific menu.

For embodiments using a swipe gesture, the touchscreen supports a swipe gesture in which a user places a finger on the touchscreen and maintains contact with the touchscreen while moving the finger linearly in a specified direction. A swipe gesture can be considered a specific pan gesture.

In some embodiments, the touchscreen can support a pan gesture in which a user places a finger on the touchscreen and maintains contact with the touchscreen while moving the finger on the touchscreen. The pan gesture may be used for various reasons including, but not limited to, moving through screens, images, or menus at a controlled rate. Multiple finger pan gestures are also contemplated. In some embodiments, the touchscreen supports a flick gesture in which a user swipes a finger in the direction the user wants the screen to move. The flick gesture may be used for various reasons including, but not limited to, scrolling horizontally or vertically through menus or pages. In some embodiments, the touchscreen supports a pinch and stretch gesture in which a user makes a pinching motion with two fingers (e.g., thumb and forefinger) on the touchscreen or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes, a nose, chin, or objects such as styluses may be used to interact with the touchscreen. As such, the above gestures should be understood as being illustrative and should not be construed as being limiting in any way.

Figure 5:
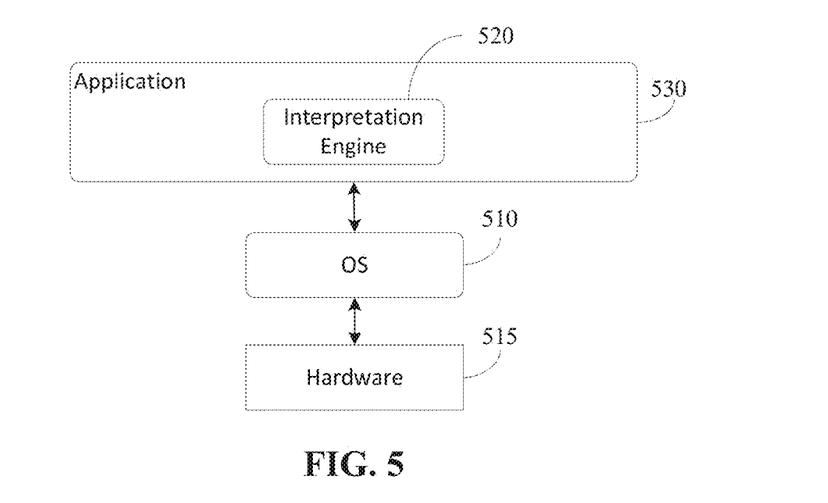
FIG. 5 illustrates an architecture for a computing device on which embodiments may be carried out.

To facilitate the implementation of an in-place contextual menu using gestures, the computing device implementing system 400 can include the illustrative architecture shown in FIG. 5.

Referring to FIG. 5, the operating system 425 of system 400 can include a device operating system (OS) 510. The device OS 510 manages user input functions, output functions, storage access functions, network communication functions, and other functions for the device. The device OS 510 may be directly associated with the physical resources of the device or running as part of a virtual machine backed by underlying physical resources. According to many implementations, the device OS 510 includes functionality for recognizing user gestures and other user input via the underlying hardware 515.

An interpretation engine 520 of an application 530 running on the device OS 510 listens (e.g., via interrupt, polling, and the like) for user input event messages from the device OS 510. The UI event messages can indicate a swipe gesture, panning gesture, flicking gesture, dragging gesture, or other gesture on a touchscreen of the device, a tap on the touch screen, keystroke input, or other user input (e.g., voice commands, directional buttons, trackball input). The interpretation engine 520 translates the UI event messages into messages understandable by the application. The application 530 can be a web browser application or a native application. Depending on the platform, the interface may be in hypertext markup language (HTML), Objective C, Java, or other language.

Further example configurations are described with respect to FIGS. 6A-6D.

FIGS. 6A-6D illustrate example system architectures in which embodiments may be carried out.

Figure 6A:
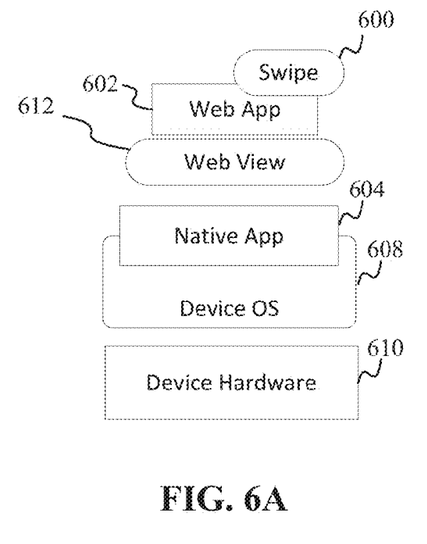
FIGS. 6A-6D illustrate example system architectures in which embodiments may be carried out.
Figure 6B:
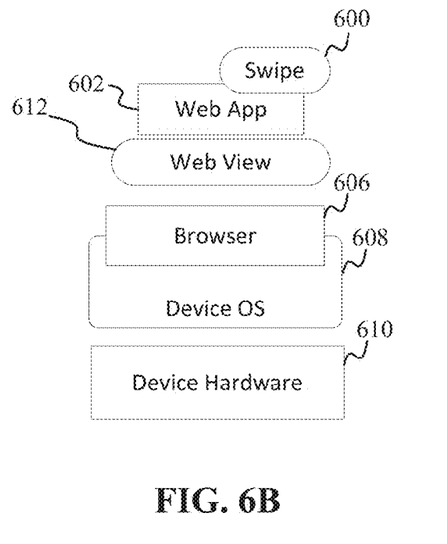

Referring to FIGS. 6A and 6B, a swipe-invoked in-place contextual menu for handling actions (Swipe 600) can be provided by a web application 602 viewed within a native application 604 or a web browser 606 running on the operating system 608 of a device 610. According to an embodiment, a web view 612 can be provided that hosts a HTML (e.g., HTML5) web application (e.g., web application 602) for any operating system 608. The native application 604 or web browser 606 brings the web view 612 to the computing device 610.

As described with respect to FIG. 4, the operating system may be SYMBIAN OS, WINDOWS PHONE OS, WINDOWS, PALM WEBOS, BLACKBERRY OS, IOS, and ANDROID OS, as well as any other suitable operating system.

The browser application 606 is an application program for retrieving and traversing information resources on the World Wide Web ("the Web"), as well as resources provided by web servers in private networks, and presenting the information resources to a user (e.g., rendering for display). Moreover, the browser application 606 allows a user to access information and various functions provided by a server or servers. In addition, or as an alternative, to accessing the productivity (or PIM) web application (or other software application hosted on the cloud) through a browser (e.g., browser application 606), some devices 610 may access the software applications hosted on the cloud through an app (an application designed for mobile devices such as smartphones and tablets).

The user interface through the browser application 606 (or app) becomes a portal to software application(s) and other resources available through the cloud service(s). A portal refers to an entry point to content and which may deliver application server content and functionality. The portal may be a web portal that brings information together from various sources and presents an aggregate of content from other systems or servers.

The browser 606 can provide the rendering engine for the user's device.

According to embodiments, the rendering engine for an email program or other program in which a list of items (on which action may be operated) may be displayed can replace or overlay the item on the region of the display with the contextual menu. In this manner, when a user selects an item, a toolbar can replace the item on the screen. A user may select multiple items to act upon and the toolbar follows the user's interaction by replacing the next item the user selects. In some cases, the in-place toolbar may remain on an earlier selected item. In other cases, the toolbar moves to the most recently selected item and an indication remains overlaid the original item(s) that the item is selected for grouping with the currently selected item. All items that are selected may be acted upon by the same command executed from the most recent selected item.

Figure 6C:
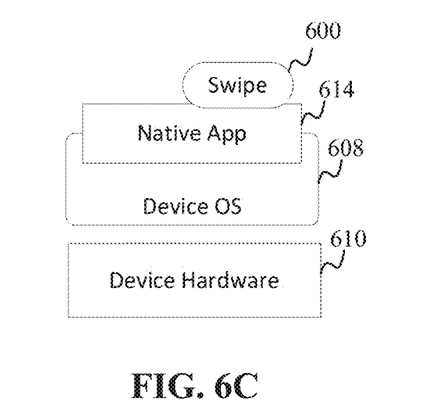

Referring to FIG. 6C, in another non-limiting embodiment, the swipe-invoked in-place contextual menu for handling actions can be native to an application running on the device. For example, a native application 614 can present the interface and functionality for a swipe-invoked in-place contextual menu (Swipe 600). In some embodiments, Objective-C or Java is used to support the swipe-invoked in-place contextual menu and interface.

Figure 6D:
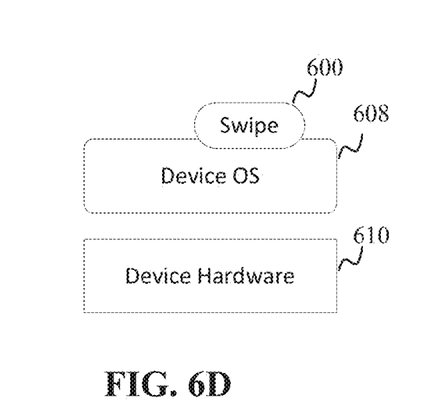

Referring to FIG. 6D, in one non-limiting embodiment, the swipe-invoked in-place contextual menu for handling actions (Swipe 600) can be built into the device operating system 608 and PIM applications running on the device 610 can use the available functionality to permit a user to perform a swipe-invoked in-place contextual menu.

In a further embodiment, the functionality for the swipe-invoked in-place contextual menu for handling actions can be supported by the operating system 608 and used by third party applications through an application programming interface (API).

Figure 7:
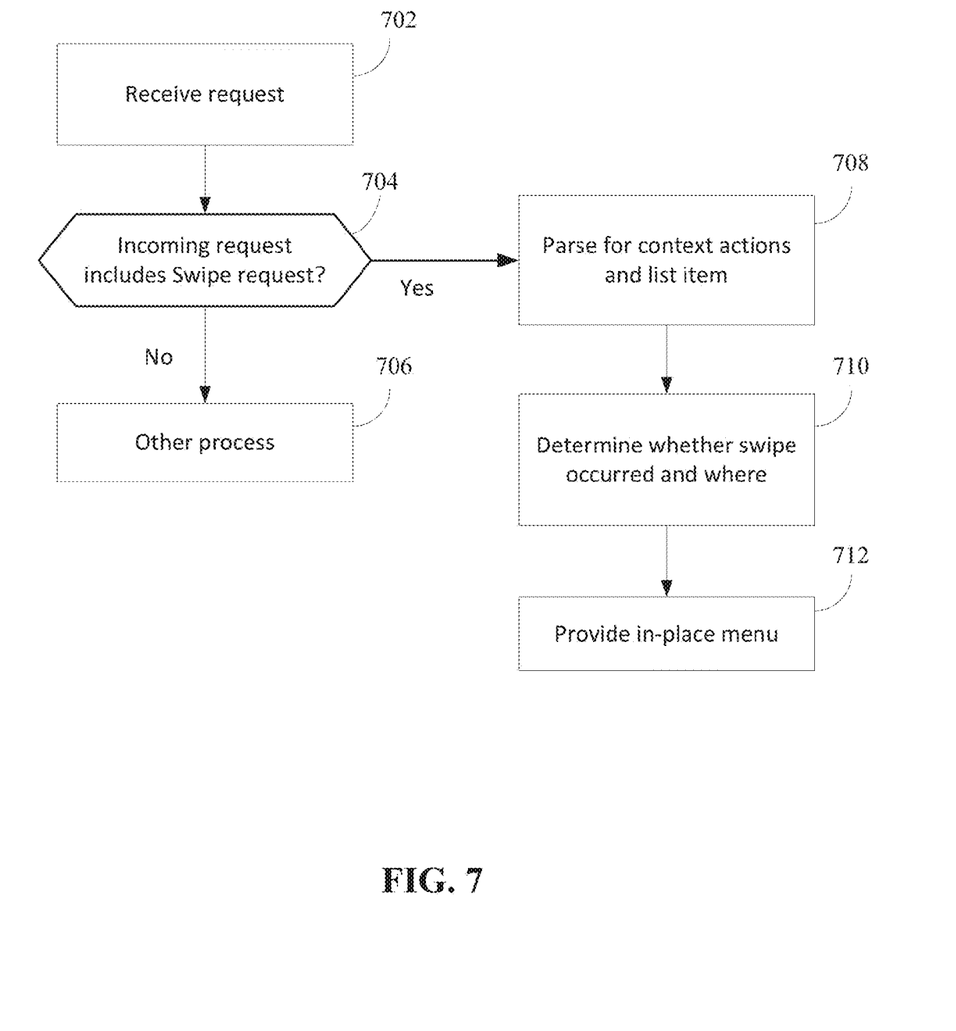
FIG. 7 illustrates an example operation of an application programming interface for implementing an in-place contextual menu for handling actions for a listing of items.

FIG. 7 shows an example operation of an application programming interface for implementing an in-place contextual menu for handling actions for a listing of items.

Referring to FIG. 7, a request can be received (702) by the system. If it is determined (704) that the request does not include a Swipe request, then other processes may be carried out (706). If it is determined (704) that the request includes a Swipe request, then the system can parse the request for context actions and list items (708). The device can determine whether a swipe event has occurred and where (e.g., to what item) (710). Then, using the information about the context actions and list items, the system can provide an in-place menu (712). The steps carried out in response to the Swipe request can include those described with respect to FIG. 2.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Communication media, particularly carrier waves and other propagating signals that may contain data usable by a computer system, are not included in "computer-readable storage media."

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" do not consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A computer-implemented method comprising:
receiving an indication of an in-place menu selection for a first item of a list of items;
providing an in-place menu and action commands for display in place of the first item, wherein the in-place menu replaces the space of the first item in a view of the first item;
while the in-place menu and action commands are in the place of the first item, receiving an indication of an in-place menu selection for a second item of the list of items without receiving a pre-indication to invoke a multi-select mode;
removing the in-place menu and action commands from the place of the first item while maintaining selection of the first item with a visual indication of the selection and providing the in-place menu and action commands for display in place of the second item, wherein the in-place menu replaces the space of the second item in a view of the second item; and
in response to receiving a command selection of one of the action commands from the in-place menu, performing the action command for the at least the first item and the second item.

2. The method of claim 1, wherein receiving the indication of the in-place menu selection comprises receiving a swipe gesture.

3. The method of claim 1, further comprising:
determining a context of item state and providing action commands for the in-place menu according to the item state.

4. The method of claim 3, wherein the item comprises an email item; and the item state comprises read or unread.

5. The method of claim 1, further comprising:
determining a context of item type and providing action commands for the in-place menu according to the item type.

6. The method of claim 5, wherein the item type comprises an email, a message, a calendar event, a photograph, or a contact.

7. The method of claim 1, wherein providing the in-place menu and action commands for display in place of the second item moves the in-place menu and action commands from being displayed in place of the first item to being displayed in place of the second item.

8. The method of claim 1, further comprising maintaining selection of the first item until an action command or a deselect input is received.

9. The method of claim 8, wherein the deselect input comprises a swipe gesture.

10. The method of claim 1, further comprising:
receiving an indication of an in-place menu selection for a third item of the list of items;
providing the in-place menu and action commands for display in place of the third item, wherein the in-place menu replaces, overlays, or shares the space of the third item in a view of the third item;
removing the in-place menu and action commands from the second item while maintaining selection of the first item and the second item;
while the in-place menu and action commands are in the place of the third item, receiving an indication of an in-place menu selection for a fourth item of the list of items;
removing the in-place menu and action commands from the place of the third item while maintaining selection of the first item, the second item, and the third item and providing the in-place menu and action commands for display in place of the fourth item, wherein the in-place menu replaces, overlays, or shares the space of the fourth item in a view of the fourth item;
receiving a deselection input for the third item;
deselecting the third item; and
in response to receiving the command selection of one of the action commands from the in-place menu, performing the action command for the first item, the second item, and the fourth item.

11. A system comprising:
a processor;
a display;
one or more computer-readable storage media; and
an application program stored on at least one of the one or more computer-readable storage media that when executed by the processor directs the processor to provide, to the display, a graphical user interface comprising:
a swipe-invoked in-place contextual menu configured to display context related action commands for a selected item and appear in place of the selected item, wherein the in-place contextual menu replaces the space of the selected item in a view of the selected item: and, in response to a second selected item without a pre-indication to invoke a multiselect mode, move to appear in place of the second selected item and no longer appear in place of the selected item while maintaining selection of the selected item with a visual indication of the selection, the in-place contextual menu replacing the space of the second selected item in a view of the second selected item, wherein a selection of one of the context related action commands applies the action command to the selected item and the second selected item.

12. The system of claim 11, wherein a single gesture selects the item and invokes the in-place contextual menu to appear in place of the selected item.

13. A computer-readable storage medium having instructions stored thereon that, when executed by a processor, perform a method comprising:
rendering an item listing view of a plurality of items;
rendering an in-place menu and action commands in place of a first item of the plurality of items in response to receiving an indication of an in-place menu selection for the first item, wherein the in-place menu replaces the space of the first item in a view of the first item;
while the in-place menu and action commands are in the place of the first item, receiving an indication of an in-place menu selection for a second item of the plurality of the items;
rendering the in-place menu and action commands in pace of a second item of the plurality of items in response to the receiving the indication of the in-place menu selection for the second stern without receiving a pre-indication to invoke a multi-select mode, wherein the in-place menu replaces the space of the second item in a view of the second item; and removing the in-place menu and action commands for display in place of the first item, wherein the second stern comprises an item selected while selection of the first item is maintained with a visual indication of the selection.

14. The medium of claim 13, having further instructions stored thereon that, when executed by the processor, perform the method further comprising:

in response to receiving a command selection of one of the action commands from the in-place menu, performing the action command for the first item and all other items having received the indication of the in-place menu selection.

15. The medium of claim 13, wherein the in-place menu selection comprises a swipe gesture.

16. The medium of claim 13, having further instructions stored thereon that, when executed by the processor, perform the method further comprising:

determining a context of item state for the first item and providing action commands for the in-place menu according to the item state of the first item.

17. The medium of claim 16, wherein the first item comprises an email item; and the item state of the first item comprises read or unread.

18. The medium of claim 13, having further instructions stored thereon that, when executed by the processor, perform the method further comprising:

determining a context of item type for the first item and providing action commands for the in-place menu according to the item type.

19. The medium of claim 18, wherein the item type comprises an email, a message, a calendar event, a photograph, or a contact.

20. The medium of claim 13, having further instructions stored thereon that, when executed by the processor, perform the method further comprising:

maintaining selection of the first item until an action command or a deselect input is received.

21. The medium of claim 20, wherein the deselect input comprise a swipe gesture.

22. The medium of claim 13, having further instructions stored thereon that, when executed by the processor, perform the method further comprising:

rendering the in-place menu and action commands in place of a third item of the plurality of items, wherein the in-place menu replaces, overlays, or shares the space of the third item in a view of the third item;

in response to receiving an indication of the in-place menu selection for the third item, removing the in-place menu and action commands from the place of the second item, wherein the third item comprises an item selected while selection of the second item is maintained, wherein the in-place menu replaces, overlays, or shares the space of the fourth item in a view of the fourth item;

receiving a deselection input for the second item; and deselecting the second item.

23. The medium of claim 22, having further instructions stored thereon that, when executed by the processor, perform the method further comprising:

in response to receiving a command selection of one of the action commands from the in-place menu, performing the action command for the at least the first item and the third item.

\* \* \* \* \*